US008201266B2

(12) United States Patent
Campbell et al.

(10) Patent No.: US 8,201,266 B2
(45) Date of Patent: Jun. 12, 2012

(54) SECURITY SYSTEM TO PREVENT TAMPERING WITH A SERVER BLADE

(75) Inventors: Keith Manders Campbell, Cary, NC (US); Raymond Todd Greggs, Raleigh, NC (US); James Gordon McLean, Fuquay-Varina, NC (US); Caroline Magdy Metry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/124,245

(22) Filed: May 21, 2008

(65) Prior Publication Data

US 2009/0293136 A1 Nov. 26, 2009

(51) Int. Cl.
*G06F 21/00* (2006.01)

(52) U.S. Cl. .......... 726/34; 713/170; 713/320; 414/790; 361/754

(58) Field of Classification Search ..................... 726/23
See application file for complete search history.

(56) References Cited

U.S. PATENT DOCUMENTS

| | | | | |
|---|---|---|---|---|
| 4,820,103 | A * | 4/1989 | Dorner et al. | 414/790 |
| 4,982,106 | A * | 1/1991 | Castellanet et al. | 307/120 |
| 5,069,597 | A * | 12/1991 | Doctor | 414/788.7 |
| 5,791,867 | A * | 8/1998 | Kuhl | 414/795.6 |
| 6,138,194 | A * | 10/2000 | Klein et al. | 710/302 |
| 6,262,493 | B1 * | 7/2001 | Garnett | 307/64 |
| 6,381,146 | B1 * | 4/2002 | Sevier | 361/754 |
| 6,661,671 | B1 * | 12/2003 | Franke et al. | 361/752 |
| 6,928,504 | B2 * | 8/2005 | Peacock | 710/302 |
| 6,968,414 | B2 | 11/2005 | Abbondanzio et al. | |
| 7,307,837 | B2 | 12/2007 | Merkin et al. | |
| 7,898,397 | B2 * | 3/2011 | Kerr et al. | 340/407.2 |
| 2003/0105904 | A1 * | 6/2003 | Abbondanzio et al. | 710/302 |
| 2004/0052046 | A1 * | 3/2004 | Regimbal et al. | 361/687 |
| 2005/0081074 | A1 * | 4/2005 | Chheda et al. | 713/320 |
| 2005/0208809 | A1 | 9/2005 | Liang et al. | |
| 2006/0136704 | A1 * | 6/2006 | Arendt et al. | 713/2 |
| 2006/0167886 | A1 * | 7/2006 | Kantesaria et al. | 707/10 |
| 2007/0192604 | A1 * | 8/2007 | Chiasson et al. | 713/170 |
| 2007/0204332 | A1 | 8/2007 | Pan | |
| 2007/0245162 | A1 * | 10/2007 | Loffink et al. | 713/300 |
| 2008/0272887 | A1 * | 11/2008 | Brey et al. | 340/10.1 |

OTHER PUBLICATIONS

Monitoring Physical Threats in the Data Center|http://www.lamdahellix.com/%5CUserFiles%5CFile%5Cdownloads%5C102_whitepaper.pdf|Christian Cowan & Chris Gaskins|pp. 1-15|2006.*

* cited by examiner

*Primary Examiner* — Taghi Arani
*Assistant Examiner* — Mahfuzur Rahman
(74) *Attorney, Agent, or Firm* — Cynthia G. Seal; Jeffrey L. Streets

(57) ABSTRACT

Method, computer program product and apparatus for physically securing a server in response to detecting an unauthorized intrusion event. The method comprises detecting an unauthorized physical intrusion event to a data center, rack or chassis including a plurality of servers, communicating the detected unauthorized intrusion event to a management module that manages the plurality of servers, and automatically physically securing one or more of the plurality of servers against manual removal. Optionally, the step of physically securing may include disabling one or more front panel controls on the plurality of servers, such as a physical power switch. In a further option, the step of physically securing may include disabling one or more external ports on the plurality of servers, such as a keyboard-video-mouse port. A preferred method allows the one or more physically secured servers to continue to operate.

19 Claims, 2 Drawing Sheets

SECURITY SYSTEM TO PREVENT TAMPERING WITH A SERVER BLADE

BACKGROUND OF THE INVENTION

1. Field of the Invention

The present invention relates to security of server blades, and more specifically to preventing unauthorized physical interaction with a server blade.

2. Background of the Related Art

Data processing systems in general and server-class systems in particular are frequently implemented within a server chassis or rack. Each chassis or rack can hold a device (also referred to herein as a blade or server blade) on which one or more general purpose processors and/or memory devices are attached. The chassis or server blades are vertically spaced within the rack according to an industry standard displacement (the "U"). Chassis and racks are characterized in terms of this dimension such that, for example, a 42 U rack is capable of receiving 42 1 U rack-mounted devices, 21 2 U devices, or similar combinations of devices. In some instances, a server chassis may provide shared components, such as power supplies, fans, or media access devices which can be shared among all of the blades in the server blade chassis.

In a server blade environment, the ability to hot plug server blades into a chassis or rack is a standard feature. Hot plugging refers to the ability to install and remove a blade without turning off power to the chassis or rack in which the blade is received. When a new server blade is initially installed into a rack, the blade generally contains no operating system and no persistent data. Making a newly added blade functional requires deployment software that is capable of recognizing that a new blade has been added, determining the blade characteristics to uniquely identify the blade, powering the blade on, and assigning a functional boot image to the blade. For purposes of this disclosure, a boot image refers generally to software stored in persistent storage that is executed following a power-on or system reset event. The boot image may execute a self test (commonly referred to as a power on self test or POST), load a basic I/O system (BIOS) into memory, and install a functional operating system.

While the use of a chassis, rack or both can beneficially facilitate the easy configuration and expansion of server systems, it also allows server blades to be moved about quickly and easily. The mobility of rack-mounted server blades can increase the difficulty of monitoring the exact location of blades within a system or group of systems.

BRIEF SUMMARY OF THE INVENTION

One embodiment of the present invention provides a method for securing a server against an unauthorized intrusion event. The method comprises detecting an unauthorized physical intrusion event to a data center, rack or chassis including a plurality of servers, communicating the detected unauthorized intrusion event to a management module that manages the plurality of servers, and automatically physically securing one or more of the plurality of servers against manual removal. Optionally, the step of physically securing may include disabling one or more front panel controls on the plurality of servers, such as a physical power switch. In a further option, the step of physically securing may include disabling one or more external ports on the plurality of servers, such as a keyboard-video-mouse port. A preferred method allows the one or more physically secured servers to continue to operate.

Another embodiment of the present invention provides a computer program product embodied on a computer readable medium, wherein the computer program product including computer usable instructions. The computer program product comprises instructions for detecting an unauthorized physical intrusion event to a data center, rack or chassis housing a plurality of servers, and instructions for automatically physically securing one or more of the plurality of servers against manual removal in response to detecting the unauthorized physical intrusion event. Optionally, the computer program product may further comprise instructions for implementing any one or more steps or aspects of the presently disclosed methods.

A further embodiment of the present invention provides an apparatus comprising a chassis including a plurality of servers, a sensor for detecting an unauthorized intrusion event, an electronically controllable lock secured to the chassis, and a management module. The management module is in communication with the plurality of servers for managing the operation of the plurality of servers, in communication with the sensor for receiving an electronic signal from the sensor in response to detecting the unauthorized intrusion event, and in communication with the electronically controllable lock for selectively locking the at least one of the plurality of servers against physical removal from the chassis in response to receiving an electronic signal from the sensor. Optionally, each of the plurality of servers may include a baseboard management controller in communication with the management module, wherein the management module instructs the baseboard management controller to disable one or more input/output devices of one or more of the plurality of servers in response to detecting the unauthorized intrusion event.

DETAILED DESCRIPTION OF THE INVENTION

Figure 1:
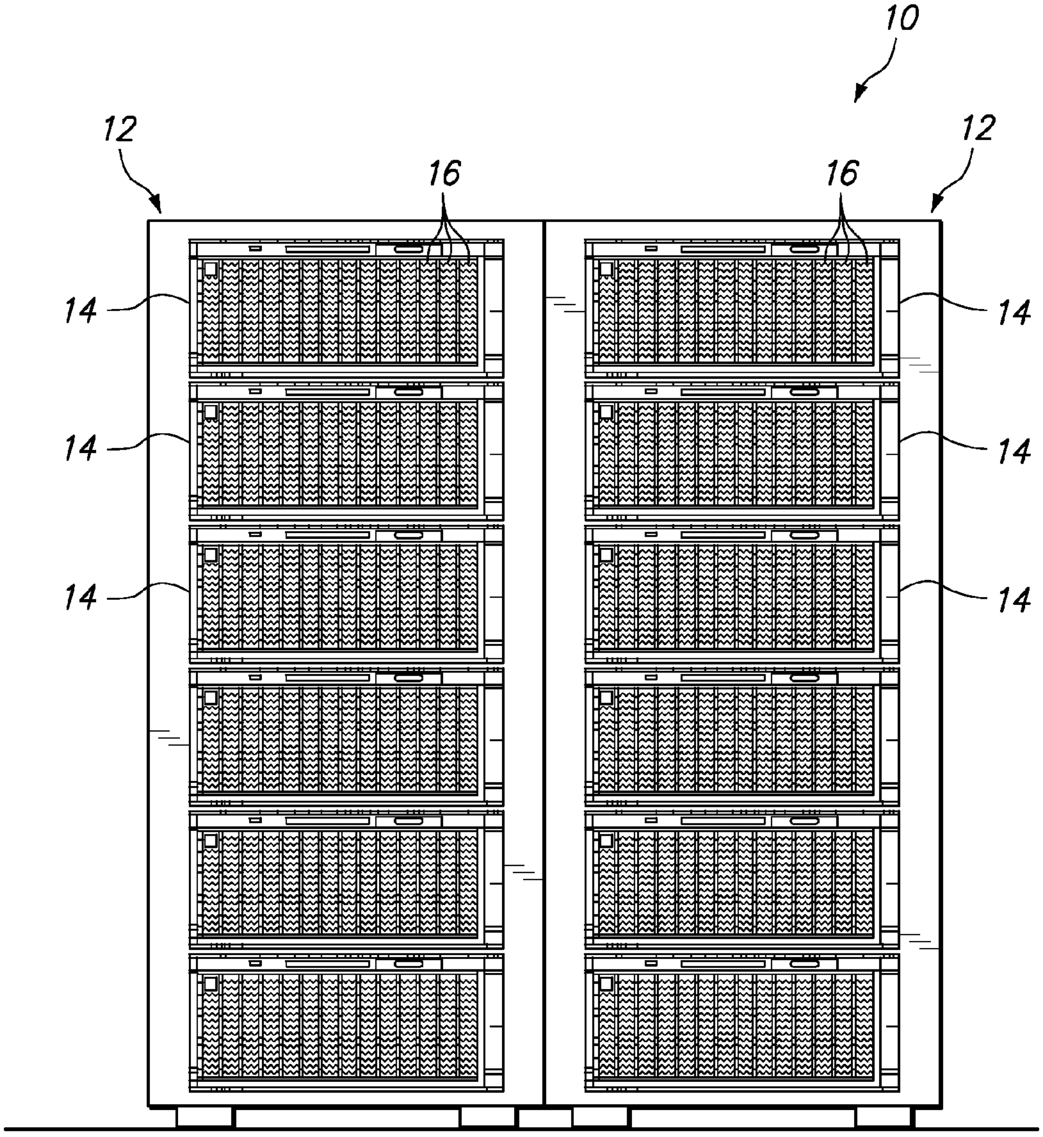
FIG. 1 is a schematic elevation view of a data center having two racks supporting numerous chassis filled with server blades.

One embodiment of the present invention provides a method for securing a server against an unauthorized intrusion event. The method comprises detecting an unauthorized physical intrusion event to a data center, rack or chassis including a plurality of servers, communicating the detected unauthorized intrusion event to a management module that manages the plurality of servers, and automatically physically securing one or more of the plurality of servers against manual removal.

Optionally, the step of physically securing may include disabling one or more front panel controls on the plurality of servers, such as a physical power switch. In a further option, the step of physically securing may include disabling one or more external ports on the plurality of servers, such as a keyboard-video-mouse port. These steps may be beneficially used to prevent loss of the server's performance and/or unauthorized electronic access to the server. Although it would be possible to shutdown the server in order to thwart unauthorized access, this would cause an inconvenient or damaging outage to those presently using the server. Physically securing the server and disabling external controls and ports allows the one or more physically secured servers to continue to operate.

In a further option, the step of detecting the unauthorized intrusion event may include receiving an electronic signal from one or more sensor, such as a sensor that is external to the server blade that is being secured. For example, the sensor may be an electronic keypad lock on a door to the data center or rack that can sense tampering or entry of successive incorrect codes. The sensor could also be a motion sensor in the data center. Furthermore, the sensor could be an accelerometer mounted to the rack or chassis that is sensitive to bumping, rocking or general physical manipulation of the rack or chassis.

In another embodiment, a plurality of sensors, sensor types and/or sensor locations are used in order to detect unauthorized intrusion events. These sensors may each send electronic signals that give the management module additional information about the intrusion event. For example, tampering with a data center door lock would indicate a possible intrusion to the data center, but a subsequent detection of motion within the data center would indicate that the intruder had actually entered the data center. Subsequent opening of a rack door would further suggest that the intruder plans to physically or electronically access a server blade. Accordingly, the method may further comprise determining a threat level on the basis of the electronic signals received from the one or more sensors. A different threat level may cause the management module to take different steps to physically secure one or more of the plurality of servers.

Non-limiting examples of sensors that might be used in the present invention include motion sensors, proximity sensors, limit switches, and accelerometers. A motion sensor can detect that something or someone has moved within the environment of the datacenter, at least within a line of sight. Proximity sensors and limit switches can detect whether there has been a change in the physical relationship between two adjacent components, such as the opening of a door. An accelerometer detects sudden movement of the component attached to the accelerometer, such as the bumping of a rack.

In yet another embodiment, the step of physically securing includes locking the plurality of servers in place within a chassis or rack. For example, an electronically controllable lock may be secured to the chassis frame and includes an actuator for moving a pin between a retracted position (server unlocked) and an extended position (server locked). In the extended position, the pin has a first end secured to the actuator and a second end that extends into a hole or indentation in the server blade casing so that the server cannot be removed. The chassis may include an individual lock for one or more server blade or a collective lock that secures each of the servers present in the chassis. However, a lock may be provided for certain critical server blades and not for others. The lock is preferably failsafe in a locked condition so that the lock automatically engages when there is a loss of power to the chassis.

In a still further embodiment, an alert may be sent to a remote user device in response to detecting the unauthorized intrusion event. For example, the alert may include a description of the sensors that detected the intrusion and/or a description of the steps taken to physically secure the one or more servers.

Another embodiment of the present invention provides a computer program product embodied on a computer readable medium, wherein the computer program product including computer usable instructions. The computer program product comprises instructions for detecting an unauthorized physical intrusion event to a data center, rack or chassis housing a plurality of servers, and instructions for automatically physically securing one or more of the plurality of servers against manual removal in response to detecting the unauthorized physical intrusion event. Optionally, the computer program product may further comprise instructions for implementing any one or more steps or aspects of the presently disclosed methods. For example, the computer program product may further comprise instructions for allowing the plurality of servers to continue operating, even through the servers may be physically locked and the front panel controls and inputs may be disabled. If it is determined that the intrusion event has cleared or that the threat level has been reduced to an acceptable level, then one or more of the steps taken to physically secure the servers may be reversed or reduced.

A further embodiment of the present invention provides an apparatus comprising a chassis including a plurality of servers, a sensor for detecting an unauthorized intrusion event, an electronically controllable lock secured to the chassis, and a management module. The management module is in communication with the plurality of servers for managing the operation of the plurality of servers, in communication with the sensor for receiving an electronic signal from the sensor in response to detecting the unauthorized intrusion event, and in communication with the electronically controllable lock for selectively locking the at least one of the plurality of servers against physical removal from the chassis in response to receiving an electronic signal from the sensor. Optionally, each of the plurality of servers may include a baseboard management controller in communication with the management module, wherein the management module instructs the baseboard management controller to disable one or more input/output devices of one or more of the plurality of servers in response to detecting the unauthorized intrusion event. In one embodiment, the baseboard management controller disables one or more input/output devices, such as a power switch or a KVM port, by instructing the operating system to temporarily ignore input from components on the front panel of the server, such as a USB interface.

Another embodiment of the apparatus further comprises a plurality of sensors, sensor types and/or sensor locations that are used in order to detect unauthorized intrusion events. These sensors may each send electronic signals that give the management module additional information about the intrusion event, as previously described. It should be recognized that the sensors may communicate with the management module indirectly, such as through one or more system input/output cards. Furthermore, the sensors may be coupled to one or more system input/output cards of a remote computer that is networked with the chassis management module or multiple chassis management modules. Optionally, the remote computer may be a system management workstation running system management software that can be user customized to identify the available sensors, associate sensor signals with threat levels, and indicate the security steps that will be taken in response to a given threat level.

As will be appreciated by one skilled in the art, the present invention may be embodied as a system, method or computer program product. Accordingly, various embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic elevation view of a data center 10 having two racks 12 supporting numerous chassis 14 filled with server blades 16. The data center 10 provides electrical power, external communication lines, and cool air circulation to support the operation of the server blades 16 and other components such power supplies, fans, network switches, and management modules.

Figure 2:
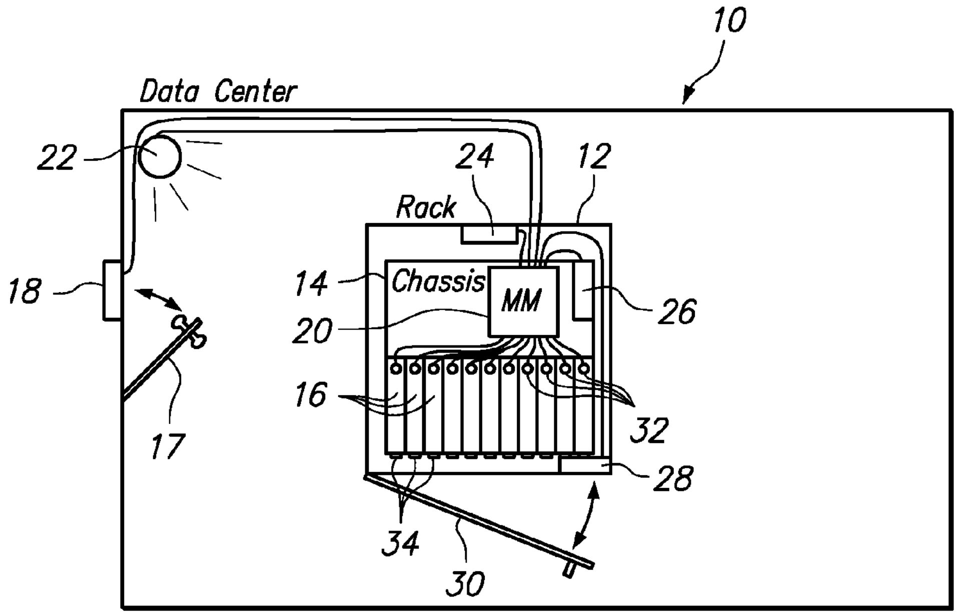
FIG. 2 is a schematic plan view of a data center having a security system.

FIG. 2 is a schematic plan view of the data center 10 having one example of a security system. The security system includes a data center door assembly 17 having a key lock or cipher lock with a lock sensor 18 providing output if there is tampering with the lock or if a successive number of incorrect codes are entered. The output of the lock sensor 18 is provided to a chassis management module (MM) 20. The security system also includes a motion detector 22 directed to detect motion within the data center 10. Furthermore, the rack 12 and chassis 14 are each equipped with an accelerometer 24, 26, and the rack 12 also includes a limit switch 28 for detecting that the rack door 30 has been opened. In accordance with one or more of the previously described embodiments of the methods, computer program products and systems of the present invention, the management module 20 controls the operation of locks 32 that are secured to the chassis 14 in alignment with the individual server blades 16. The management module 20 is also preferably in communication with a baseboard management controller (not shown) in each server blade 16 so that the management module 20 can disable the front panel controls 34 of each server blade.

Figure 3:
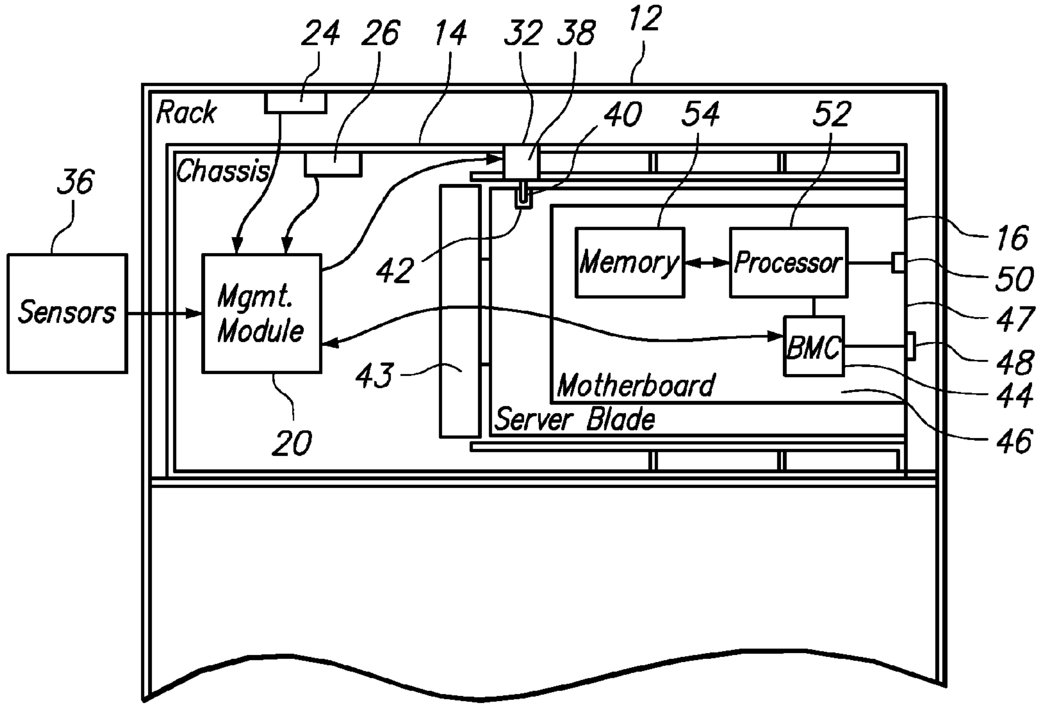
FIG. 3 is a schematic side view of a server blade installed in a chassis supported by the rack, wherein the security of the server blade is protected by the security system.

FIG. 3 is a schematic side view of a single server blade 16 installed in the chassis 14 supported by the rack 12, wherein the security of the server blade 16 is protected by the security system. Sensors 36, such as the lock sensor 18 (FIG. 2), motion sensor 22 (FIG. 2), rack accelerometer 24 or chassis accelerometer 26, provide input to the management module 20. The management module 20 may then send output to the electronically controllable lock 32, which may include an actuator 38 and pin 40. Preferably, the actuator 38 operates to actively withdraw the pin 40 (upward in FIG. 3) from the aligned hole 42 in the casing of the server blade 16. As shown, the pin 40 engages the hole 42 and prevents the removal of the server blade 16 from the chassis 14.

The management module 20 is also in communication, for example through a mid-plane 43 with a baseboard management controller (BMC) 44 that forms part of the motherboard 46 within the server blade 16. The management module 20 can provide instructions to the BMC 44, such as using intelligent platform management interface (IPMI) codes. Accordingly, when the management module 20 determines that a sufficient threat level exists, it may instruct the BMC 44 to disable controls on the front panel 47 of the server blade 16, including the power switch 48 and the KVM port 50. For example, the BMC 44 may instruct the operating system that is loaded from memory 54 and running in the processor 52 to ignore any input received from the KVM port 50. Furthermore, the BMC 44 may disable the power switch 48 from communicating with a power supply (not shown) that supplies power to the server blade 16, such as by sending an instruction over a power management bus to a power management controller (not shown).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

detecting an unauthorized physical intrusion event to a data center, a rack or a chassis housing a plurality of servers using at least one of a motion sensor to sense movement within the data center, an electronic keypad lock on at least one of a door to the data center and a door on the rack, a limit switch on the door to the rack, and one or more accelerometers coupled to at least one of the rack and one of the plurality of servers, wherein detecting the unauthorized physical intrusion event includes receiving an electronic signal from one or more of the motion sensor, the electronic keypad lock, the limit switch and the one or more accelerometers;

communicating the detected unauthorized physical intrusion event to a management module that manages the plurality of servers; and automatically physically securing one or more of the plurality of servers against manual removal by engaging a lock member to physically secure at least one of the plurality of servers against unauthorized removal from the rack.

2. The method of claim 1, wherein the step of detecting the unauthorized intrusion event includes receiving electronic signals from two or more of the motion sensor, the electronic keypad lock, the limit switch and the one or more accelerometers.

3. The method of claim 2, wherein the two or more sensors include the motion sensor and the electronic keypad lock.

4. The method of claim 2, wherein the two or more sensors include an accelerometer mounted to at least one of the rack and chassis.

5. The method of claim 1, wherein the step of physically securing includes disabling one or more front panel controls on the plurality of servers.

6. The method of claim 5, wherein the one or more disabled front panel controls includes a physical power switch.

7. The method of claim 1, wherein the step of physically securing includes disabling one or more external ports on the plurality of servers.

8. The method of claim 1, further comprising:

continuing to operate the one or more physically secured servers.

9. The method of claim 1, wherein the one or more servers are not physically secured in the absence of detecting the unauthorized physical intrusion event.

10. The method of claim 1, wherein the step of physically securing includes engaging a lock member to lock the plurality of servers in place within at least one of the chassis and rack.

11. The method of claim 10, wherein the step of engaging a lock member includes engaging a lock member between the chassis and a plurality of casings of the one or more servers.

12. The method of claim 11, wherein the lock member automatically engages in response to a loss of power to the chassis.

13. The method of claim 1, further comprising:

sending an alert to a remote user device in response to detecting the unauthorized physical intrusion event.

14. The method of claim 1, further comprising:

determining a threat level on the basis of the electronic signals received from the one or more sensors.

15. The method of claim 13, further comprising:

selecting steps for physically securing the one or more of the plurality of servers on the basis of the determined threat level.

16. A computer program product embodied on a non-transitory computer readable storage medium, the computer program product including computer usable instructions, comprising:

instructions for detecting unauthorized physical intrusion event to a data center, rack or chassis housing a plurality of servers using at least one of a motion sensor to detect movement within the data center, an electronic keypad lock on at least one of a door to the data center and a door to the rack, a limit switch on at least one of the rack and the chassis, and an accelerometer on at least one of a server and the chassis, wherein the unauthorized physical intrusion event is detected by receiving an electronic signal from one or more of the motion sensor, the electronic keypad lock, the limit switch and the one or more accelerometers; and instructions for at least one of:

automatically physically securing one or more of the plurality of servers against manual removal using an electronically controllable lock; and disabling a front display panel;

in response to detecting the unauthorized physical intrusion event.

17. The computer program product of claim 16, further comprising:

instructions for allowing the plurality of servers to continue operating.

18. An apparatus comprising:

a chassis housing a plurality of servers;

a plurality of sensors for detecting an unauthorized intrusion event;

an electronically controllable lock secured to the chassis; and a management module in communication with the plurality of servers for managing the operation of the plurality of servers, in communication with the plurality of sensors for receiving an electronic signal from the plurality of sensors in response to detecting the unauthorized intrusion event, and in communication with the electronically controllable lock for selectively locking the at least one of the plurality of servers against removal from the chassis in response to receiving the electronic signal from two or more of the plurality of sensors;

wherein the plurality of sensors comprises at least two of a motion sensor, an electronic keypad lock, a limit switch coupled to a door to the chassis and an accelerometer.

19. The apparatus of claim 18, wherein each of the plurality of servers includes a baseboard management controller in communication with the management module, wherein the management module instructs the baseboard management controller to disable one or more input/output devices of one or more of the plurality of servers.

* * * * *